(12) United States Patent
Gang et al.

(10) Patent No.: US 10,728,633 B2
(45) Date of Patent: Jul. 28, 2020

(54) CONFIGURABLE DISTRIBUTED SMART SENSOR SYSTEM

(71) Applicant: Simmonds Precision Products, Inc., Vergennes, VT (US)

(72) Inventors: Travis Gang, Hinesburg, VT (US); Travis Dement, Burlington, VT (US); Benjamin T. Rule, Vergennes, VT (US); Thomas Henck, Huntington, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 16/226,277

(22) Filed: Dec. 19, 2018

(65) Prior Publication Data

US 2020/0204882 A1 Jun. 25, 2020

(51) Int. Cl.
*H04Q 9/00* (2006.01)
*H04L 29/08* (2006.01)

(52) U.S. Cl.
CPC ............. *H04Q 9/00* (2013.01); *H04L 67/10* (2013.01); *H04L 67/12* (2013.01)

(58) Field of Classification Search
None
See application file for complete search history.

(56) References Cited

U.S. PATENT DOCUMENTS 6,709,779 B2 * 3/2004 Uozumi ............ H01M 8/04029
429/429
7,343,579 B2 * 3/2008 Coxe ................... G06F 15/7867
714/3

8,237,515 B2 8/2012 Keating
8,450,948 B2 5/2013 Huang et al.
8,670,946 B2 * 3/2014 Salazar .................... G01D 4/02
702/62

(Continued)

FOREIGN PATENT DOCUMENTS

CA 2607464 7/2008
JP 2010049584 A 3/2010
WO WO-2015001400 A1 1/2015

OTHER PUBLICATIONS

Extended European Search Report for European Patent Application No. EP19217950.5, dated Apr. 21, 2020.

*Primary Examiner* — Chico A Foxx
(74) *Attorney, Agent, or Firm* — Locke Lord LLP; Scott D. Wofsy; Judy R. Naamat

(57) ABSTRACT

A sensor node of a sensing network acquires first sensing data from an internal sensing node and/or second sensing data via an interface from an external sensing node. The sensor node is configured with a selected configuration file. The first and second events are detected as a function of the first and/or second sensing data based on the configuration file. The method further includes performing a first action set of the plurality of action sets as a function of detecting the first event and performing a second action set of the plurality of action sets as a function of detecting the second event, wherein the first and second action sets are defined by the configuration file. Once configured with the configuration file, detecting the first and second events and performance of any of the first and second action sets is performed autonomously of a controller or host of a system being monitored by the sensing network.

18 Claims, 4 Drawing Sheets

(56) References Cited

U.S. PATENT DOCUMENTS

| | | | |
|---|---|---|---|
| 8,818,614 B1 | 8/2014 | Lekutai | |
| 8,892,403 B1 * | 11/2014 | Le Grand | G01D 9/005 |
| | | | 702/187 |
| 9,606,603 B2 | 3/2017 | Bodner et al. | |
| 9,845,164 B2 | 12/2017 | Ahmed et al. | |
| 10,078,955 B1 | 9/2018 | Gang et al. | |
| 2006/0020774 A1 * | 1/2006 | Ramos | G06F 13/4217 |
| | | | 712/226 |
| 2006/0117164 A1 * | 6/2006 | Coxe | G06F 15/7867 |
| | | | 712/15 |
| 2013/0342355 A1 * | 12/2013 | Lund | G08C 17/02 |
| | | | 340/870.01 |
| 2014/0023087 A1 * | 1/2014 | Czompo | H04W 88/02 |
| | | | 370/465 |
| 2016/0091370 A1 | 3/2016 | Schnaare | |
| 2016/0132091 A1 * | 5/2016 | Bodner | G06F 1/3206 |
| | | | 713/323 |
| 2016/0198244 A1 * | 7/2016 | Lund | G08C 17/02 |
| | | | 340/870.07 |
| 2017/0067860 A1 * | 3/2017 | Grabill | G01P 3/481 |
| 2017/0223628 A1 * | 8/2017 | Snyder | H04W 52/0212 |
| 2017/0283084 A1 * | 10/2017 | Gang | B64D 45/00 |
| 2018/0237030 A1 | 8/2018 | Jones et al. | |
| 2018/0284735 A1 * | 10/2018 | Cella | G05B 19/41875 |
| 2018/0365083 A1 | 12/2018 | Gang et al. | |
| 2019/0324432 A1 * | 10/2019 | Cella | G06N 3/0436 |
| 2019/0324434 A1 * | 10/2019 | Cella | G05B 23/024 |
| 2019/0324435 A1 * | 10/2019 | Cella | G05B 23/0283 |
| 2019/0324444 A1 * | 10/2019 | Cella | G05B 19/4184 |
| 2019/0339688 A1 * | 11/2019 | Cella | G06K 9/6263 |

* cited by examiner

CONFIGURABLE DISTRIBUTED SMART SENSOR SYSTEM

BACKGROUND

1. Field of the Disclosure

The present disclosure relates to smart sensor systems, and more particularly, to a configurable distributed smart sensor system.

2. Description of Related Art

Condition monitoring systems are often used to monitor parameters in machinery. These systems include temperature sensors, pressure sensors, vibration sensors, and many other types of sensors, utilized to detect the development of faults. The data collected may be digitized, transformed and algorithmically processed to extract features of the monitored system. A given feature can be generated from the input of one sensor or could be dependent on the interaction of multiple sensors. Features extracted may be compared against expected values to assess the relative health of that feature. Sensor data may be monitored and evaluated on a scheduled basis and/or on an event basis. Event based monitoring is typically used to diagnose the circumstances leading to the event, identify the event, diagnose the potential impacts of the event, and drive actions based upon the event. Actions occurring as the result of event detection are typically time sensitive and need to be performed autonomously based upon pre-determined logic.

Prior art condition monitoring systems included several analog sensors feeding into a central host for digitization and further processing. This implementation required individual cabling for each analog sensor which resulted in a heavy system that required a complicated installation. These issues can be mitigated by distributing digitization and processing of data out locally to the sensor. Local processing of data reduces the processing load on the host, allowing the host to perform other more complex functions, or decrease in size and complexity.

Transmission of digital data allows multiple digital sensors to be connected on a single digital bus, reducing the wire weight associated with individual analog wire runs for each sensor.

In certain prior art analog systems, the host was in control of all the data buffering as well as event detection, and follow on action. This approach made for a relatively simple but individually customized solution for given applications. With distributed processing, this data collection becomes more complex, but provides opportunity for simplifying customization to new applications. It is desirable to develop methods of handling autonomous actions based on event detection for distributed processing sensor systems.

While conventional methods and systems have generally been considered satisfactory for their intended purpose, there is still a need in the art for reliable distributed sensor systems and methods for monitoring a system using configurable distributed sensors.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a sensor node of a plurality of sensor nodes of a sensing network for monitoring a system. The sensor node includes one or more of a) at least one integral sensing elements and b) an interface for communicating with at least one external sensing element. Each of the integral sensors is internal to the sensor node and is configured to sense a physical characteristic of the system and output associated first sensing data. Each of the at least one external sensing element is external to the sensor node and is configured to sense a physical characteristic of the system and output associated second sensing data.

A processing device is configurable with a configuration file selected from a plurality of configuration files. The configuration file defines a plurality of action sets to perform in association with detection of respective first and second events. The processing device is further configured to acquire at least one of the first and second sensing data from a respective at least one of the integral sensing element and the at least one external sensing element via the interface, detect the first and second events as a function of at least one of the first and second sensing data based on the configuration file, and perform a first action set of the plurality of action sets as a function of detecting the first event and perform a second action set of the plurality of action sets as a function of detecting the second event. The first and second action sets are defined by the configuration file, and once the processing device is configured with the configuration file, detection of the first and second events and performance of any of the first and second action sets is performed autonomously of the controller or host of the system.

In embodiments, the processing device can be further configured to initiate an event trigger, the first action set can be only performed upon initiation of the event trigger, and the event trigger can be initiated whenever the first event is detected.

In embodiments, the processing device can be further configured to initiate an event trigger, the first action set can be only performed upon initiation of the event trigger, and detection of the event trigger can be a function of at least one logic operation applied to output of detection of the first and second events as a function of sensing data output by at least two sensing elements of the at least one integral sensing elements and the at least one external sensing elements.

In embodiments, the sensing data output by the at least two sensing elements can include the first sensing data as output by first and second integral sensing elements of the at least one integral sensing element.

In embodiments, the sensing data output by the at least two sensing elements can include the first sensing data as output by a first integral sensing elements of the at least one integral sensing element and a first external sensing element of the at least one external sensing element.

In embodiments, the processing device can be further configured to initiate at least one event trigger, the first and second action sets can be only performed in response to initiation of one of the at least one event triggers, and before the at least one event trigger is detected, the at least one integral sensing element and the at least one external sensing element can operate in a listening mode to continually retain a limited amount of the respective first and second sensing data.

In embodiments, operating in the listening mode by the at least one integral sensing element and the at least one external sensing element can further include continually digitizing prior to the retaining the limited amount of the respective first and second sensing data.

In embodiments, the first action set can include at least one sensing element of the at least one integral sensing element and the at least one external sensing element exiting the listening mode, and exiting the listening mode can include retaining an amount of the first or second sensing data specified by the first action set.

In embodiments, the at least one sensing element exiting the listening mode can further include submitting a second specified amount of the first or second sensing data for recordation by an external recording device, and the second specified amount can include at least one of a third specified amount of previously retained first or second sensing data and a fourth specified amount of not yet output first or second sensing data.

In embodiments, the at least one sensing element operating in the listening mode can include continually monitoring whether the at least one event trigger was initiated.

In embodiments, the processing device can be re-configurable for being configured with a second configuration file different than the first configuration file at any time during a lifetime of the sensor node.

In embodiments, prior to detection of the first and second events, the at least one external sensor can be unpowered, and the first action set can include controlling provision of power to the at least one external sensor for providing power to the at least one external sensor.

In embodiments, controlling provision of the power to the at least one external sensor can include controlling the provision of the power to be temporary.

In another aspect, a method is provided that is performed by a sensor node of a plurality of sensor nodes of a sensing network configured for monitoring a system. The method includes being configured with a configuration file selected from a plurality of configuration files and acquiring at least one of first and second sensing data associated with sensing a physical characteristic of the system. The first sensing data is acquired internal to the sensor node, and the second sensing data is acquired external to the sensor node via an interface. The configuration file defines a plurality of action sets to perform in association with detection of respective first and second events. The method further includes detecting the first and second events as a function of at least one of the first and second sensing data based on the configuration file, performing a first action set of the plurality of action sets as a function of detecting the first event, and performing a second action set of the plurality of action sets as a function of detecting the second event. The first and second action sets are defined by the configuration file, and after being configured with the configuration file, detection of the first and second events and performance of any of the first and second action sets is performed autonomously of the controller or host of the system.

In embodiments, the method further includes initiating an event trigger, wherein, the first action set may only performed upon initiation of the event trigger, and detection of the event trigger is a function of at least one logic operation applied to output of detection of the first and second events as a function of sensing data output by at least two sensing elements of the at least one integral sensing elements and the at least one external sensing elements.

In embodiments, the method further includes initiating at least one event trigger. The first and second action sets may only be performed in response to initiation of one of the at least one event triggers. Additionally, before the at least one event trigger is detected, the at least one integral sensing element and the at least one external sensing element can operate in a listening mode to continually retain a limited amount of the respective first and second sensing data.

In embodiments, the first action set can include one or more of the integral sensing elements and/or one or more of the external sensing elements exiting the listening mode, wherein exiting the listening mode can include retaining an amount of the first or second sensing data specified by the first action set.

In embodiments, prior to detection of the first and second events, the at least one external sensor can be unpowered, and the first action set can include controlling provision of power to the at least one external sensor for providing power to the at least one external sensor.

In accordance with still another aspect of the disclosure, a controller or host of a sensing network is provided. The sensing network has a plurality of sensor nodes for monitoring a system. Each of the sensor nodes is associated with a sensor element configured to sense a physical characteristic of the system and output associated second sensing data. The controller or host includes a memory configured to store instructions and a processor disposed in communication with the memory. The processor, upon execution of the instructions, is configured to configure each of the plurality of sensor nodes to detect first and second events as a function of the sensing data based on the individual sensor's configuration, and to perform based on the individual sensor's configuration a first action set of a plurality of action sets as a function of detecting the first event and perform a second action set of the plurality of action sets as a function of detecting the second event. Once a sensor node of the plurality of sensor nodes is configured, the controller or host is not involved in the sensor node detecting the first or second events or performing the first or second action sets.

In embodiments, the processor, upon execution of the instructions, is further configured to receive data from the sensor node as a result of the sensor node performing one or more of the first action set and the second action set, regardless of whether the controller or host was coupled to the sensor node when the sensor node detected one or more of the first and second events.

These and other features of the systems and methods of the subject disclosure will become more readily apparent to those skilled in the art from the following detailed description of the embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE EMBODIMENTS

Figure 1:
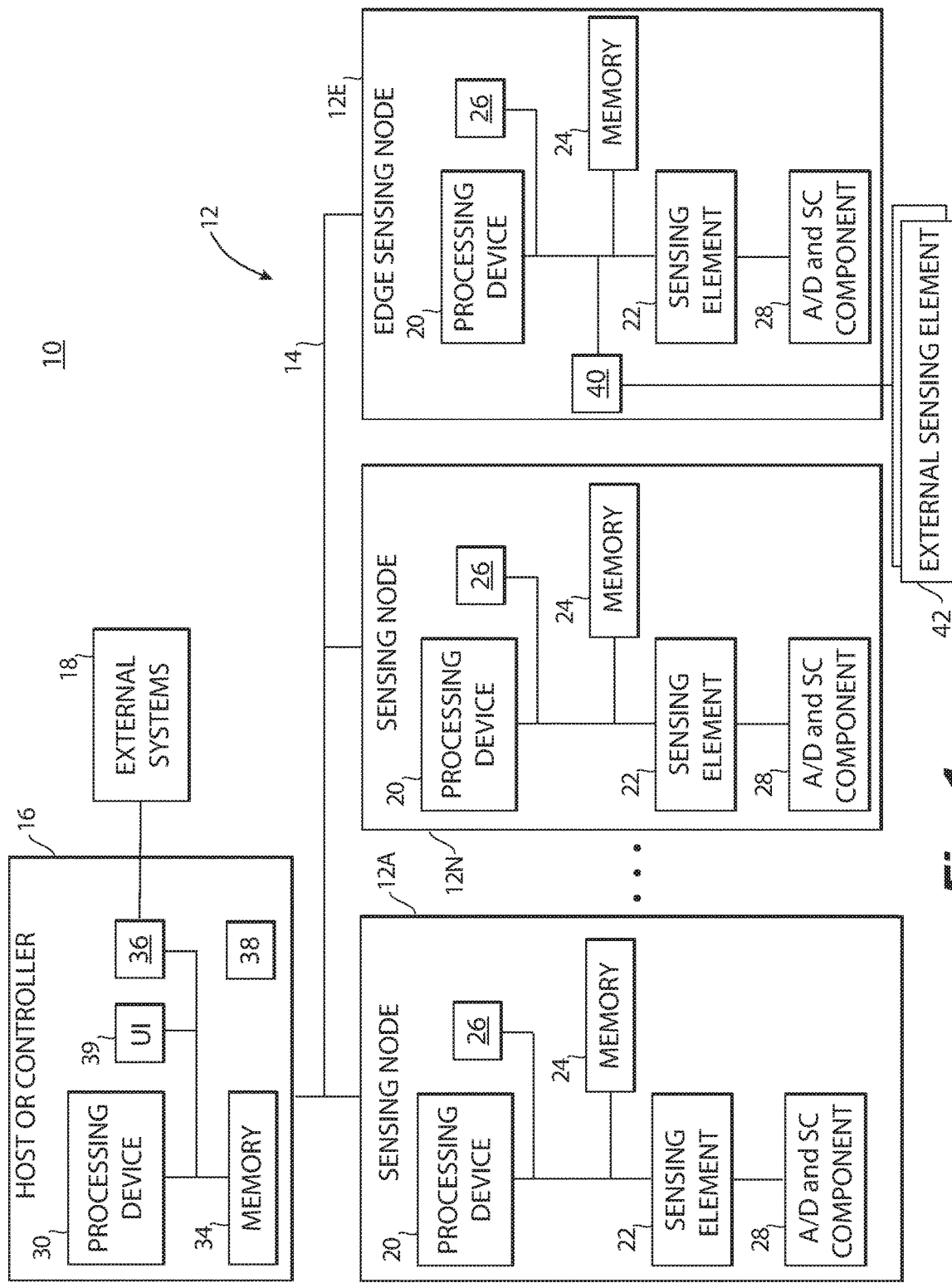
FIG. 1 is a block diagram illustrating example distributed sensing nodes communicating via a bus with a host or controller in accordance with embodiments of the disclosure.

Reference will now be made to the drawings wherein like reference numerals identify similar structural features or aspects of the subject disclosure. For purposes of explanation and illustration, and not limitation, a block diagram of an exemplary embodiment of a smart sensor system in accordance with the disclosure is shown in FIG. 1 and is designated generally by reference character 10. Methods associated with operations of the smart sensor system 10 in accordance with the disclosure, or aspects thereof, are provided in FIGS. 2 and 3, as will be described. The systems and methods described herein can be used to provide improved distributed data acquisition systems that provide ease of customization for performance of autonomous actions based on event detection.

FIG. 1 is a block diagram illustrating smart sensor system 10 that includes distributed sensing nodes 12a-12n (also referred to generally as sensing nodes 12), which can include edge sensing nodes 12e, connected to digital bus 14. Smart sensor system 10 includes a distributed network of sensing nodes 12 that are each configurable to autonomously perform selected actions based on autonomous detection of different respective events and the configuration of the sensing node 12. The smart sensor system 10 includes a plurality of sensing nodes 12, which may be digital sensors, for example. A host or controller 16 (referred to generally as host 16) can be coupled to bus 14. The coupling can be temporary or permanent. The sensing nodes 12 can be connected in series, such as via bus 14.

Autonomous performance by a sensing node 12 of event detection and performance of selected actions based on the event detection refers to, once configured at production or by the host 16, performing the event detection or selected actions without any involvement of the host 16.

In one embodiment, smart sensor system 10 may be a health and usage monitoring system (HUMS) onboard an aircraft. In other embodiments, smart sensor system 10 may be any ground-based or airborne system configured to monitor characteristics of the environment.

Each sensing node 12a-12n includes a processing device 20, one or more sensing elements, which can include one or more integral sensing elements 22, a memory 24, an internal interface 26 for coupling to the other sensing nodes 12a-12n and the host via digital bus 14, and an analog/digital (A/D) converter and signal conditioning (SC) component 28 that includes components or circuits to convert to digital and condition sensed analog signals. The processing device 20 can be, for example, a programmable logic device (PLD), microprocessor, digital signal processor (DSP), a microcontroller, a field programmable gate array (FPGA), an application specific integrated circuit (ASIC), or other discrete or integrated logic circuitry having similar processing capabilities.

Each integral sensing element 22 is an integral sensor that is internal to the sensing node 12, and can sense characteristics of the environment, such as temperature, vibration, speed, acceleration, displacement, humidity, pressure, or other characteristics. The term "internal" refers to being located within or mounted to an enclosure of the sensing node 12. The enclosure can be for example a circuit card assembly or a housing, and the internal sensing element can be mounted to the circuit card assembly or disposed within the housing. The circuit card assembly can be disposed within the housing. The integral sensing element 22 can generate sensing data based on the sensing, and the sensing data can be buffered by the integral sensing element. The integral sensing elements 22 can be analog or digital, and can have the ability to perform some signal conditioning or pre-processing. The memory 24, can include volatile and non-volatile memory for buffering sensor data for a limited amount of time, retaining the sensor data until deleted or overwritten. All or portions of memory 24 can be integrated into the sensing element 22. In embodiments that include multiple integral sensing elements 22, each sensing element 22 can include its own portion of memory 24. In software embodiments, the memory 24 can store programmable instructions executable by the processing device 20.

Before an event is detected, sensing data generated by each integral sensing element 22 is buffered and/or retained by memory 24 and processed by the processing device 20 based on configuration settings of the sensing node 12. The configuration settings can provide different buffering, retention, and processing parameters to be applied to sensing data output by respective integral sensing elements 22 of the same sensing node 12. When an event is detected by the processing device 20, the processing device 20 can output an event trigger that can cause different configuration settings to be used for the buffering, retention, and/or processing of the sensing data output by the respective integral sensing elements 22.

In embodiments, the host 16 can be coupled to one or more external systems 18, e.g., another processing device, a local or wide area network such as the Internet, etc. Host 16 includes a processing device 30, a memory 34, an internal interface 38 for coupling to the sensing nodes 12a-12n, e.g., via bus 14, and can further include an external interface 36 for coupling to the external systems 18, e.g., via near frequency communication, wired or wireless communication. The host 16 can upload data received from the sensing nodes 12 to the external systems 18 via the external interface 36. The memory 34 can include volatile and non-volatile memory for storing data temporarily or long term, and for storing programmable instructions executable by the processing device 30.

The host 16 can configure the sensing nodes 12 at any time, with the ability to configure each sensing node 12 with a unique configuration. The host 16 can store a configuration library in its memory 34 that includes multiple certified configurations. Each time that the host 16 uploads one or more of the configurations from the configuration library to one of the sensing nodes 12, there is no need for additional certification.

The host 16 can optionally have a user interface 39 (e.g., a lever, knob, keypad, graphical user interface, etc.) via which an administrator can adjust thresholds or other settings of the configurations. The adjustments available can be limited by an input process to approved ranges that are compatible with the certification.

The host 16 can be a network controller that interacts with the sensing nodes 12 to configure the sensing nodes 12 and receive sensed data from the sensing nodes 12 via digital bus 14 at some point in time. In embodiments, the host 16 can manage multiple networks of sensing nodes 12. In embodiments, the host 16 can manage additional components or systems in response to data received from the sensing nodes 12. The processing device 30 of the host 16 can have greater processing capacity than the processing devices 20 of the sensing nodes 12. Additionally, the memory 34 of the host 16 can have greater capacity than the memory 24 of the sensing nodes 12.

The host 16 thus does not function as a hub or centralized controller of the sensing nodes 12. In embodiments, the sensing nodes 12 are configured by programming configuration files into the sensing nodes 12 during a production process. In embodiments, the host 16 can configure or reconfigure the sensing nodes 12 programming or reprogramming the configuration files. Once a sensing node 12 is configured it can operate autonomously of the host 16 to detect events and determine what actions to take in response to detecting the event. The sensing node 12 can interact with the host 16 by sending it data, such as sensed data or data about the event it detected and the actions it took. The sensing node 12 can communicate this information to the host 16 after a sensing session, and can refrain from affecting the behavior of the sensing node 12 other than when configuring or reconfiguring the sensing node 12. The sensing node 12 operates autonomously by making its own decisions about detecting an event or not and which actions to take when an event is detected based on its configuration. The host 16 can use data obtained from the sensing nodes 12 during or after a sensing session, such as to identify trends and patterns.

Smart sensor system 10 can perform event based monitoring by sensing physical characteristics that may lead to an event, detect and identify the event, and perform selected actions, depending on the event identified. The conditions for detecting and identifying an event can vary based on circumstances, such as user preferences, a scenario, or application. For example, an event may be defined as a vibration or temperature exceeding a threshold. Different thresholds, trends, repeated occurrences may be used, depending on the circumstance. Additionally, the actions to be taken once an event is detected and identified can vary based on such circumstances.

Once configured, each of the sensing nodes 12 can perform the event monitoring, including sensing the physical characteristics and detecting an event based on sensed data and event detection criteria, wherein the sensed data was acquired at a sampling rate, using a bit depth, and using a gain setting. The event based monitoring can be continual or discrete for acquiring a fixed number of samples based on a configuration of the sensing node 12 or instructions received from the host 16 or another sensing node 12. In embodiments, the sensed data can be raw data output by the integral sensing element 22 that is in analog form and is unprocessed when applying the event detection criteria. In embodiments, the sensed data can be converted to digital and/or conditioned by the A/D and SC component 28 before applying the event detection criteria. In embodiments, the sensed data can be processed by the processing device 20 before applying the event detection criteria.

The event monitoring can diagnose the cause of an event, diagnose the event, and/or diagnose impacts of the event using sensed data that was sensed before, during, and/or after the event was detected. This is accomplished by buffering sensor data in a buffer of memory 24, retaining the buffered data for a configured amount of time in memory 24 by an action performed in response to detecting an event, and recording sensed data in memory 24 sensed after the event was detected.

The host 16 may be uncoupled from the digital bus 14 after configuring the sensing node 12. The host 16 can be recoupled to the digital bus 14 at a later time after sensing node 12 detects and responds to the event to download sensing data retained by the sensing node 12. For example, the host 16 can be a ground based system that interfaces with the digital bus 14, and the sensing nodes 12 can be disposed in a mobile device or vehicle, such as an aircraft.

In response to detecting the event, the sensing node 12 can perform selected actions that the sensing node 12 is configured to perform in response to the detected event, wherein the sensing, event detection and performance of the selected actions is performed autonomously with respect to the host 16.

Examples of the selected actions performed by a sensing node 12 that detected the event include: retaining the sensed data by the sensing node 12 for a configured period of time; changing power consumption of the sensing node 12; incrementing a counter associated with detection of the particular event stored by the sensing node 12; initiating a second acquisition of second sensed data of a different type than the sensed data; modifying the sampling rate for continued acquisition of the sensed data; modifying the bit depth for continued acquisition of the sensed data; modifying the gain setting for continued acquisition of the sensed data; processing the sensed data; transitioning a state of an external component from one of inactive and active to the other of inactive and active; exiting a mode of monitoring for the particular event; exiting a mode of monitoring for any event; outputting an event message to the digital bus 14 to the host 16 to cause the host 16 to notify the other sensing nodes 12 of the detected event and/or to cause the other sensing nodes 12 to perform a second selected actions; outputting an event message to the digital bus 14 to other sensing nodes 12 coupled to the digital bus 14 to notify the other sensing nodes 12 of the detected event and/or to cause the other sensing nodes 12 to perform a second selected actions. The sensing node 12 can further detect a second event based on second event detection criteria that are different than the event detection criteria and perform second selected actions different than the selected actions in response to detection of the second event.

The ability of the sensing nodes 12 to perform these operations autonomously provides particular benefits, including the ability to scale the smart sensor system 10 by adding or removing sensing nodes 12; add new capabilities for detecting or identifying events, add new capabilities for performing actions in response to detection of particular events, provide specialized sensing nodes 12; reduce mass of the sensing nodes 12 by virtue of the ability to configure the sensing nodes 12 to be special purpose sensing nodes without providing all capabilities available to all sensing nodes 12*a*-12*n*; reduce cable mass due to autonomous capabilities of the sensing nodes 12 without need for connection to the host 16 for controlling of event detection, event identification, or reaction to detected events; cost associated with the reductions in mass and complexity; the ability to reconfigure sensing nodes 12 per application or on-the-fly; and the ability to certify the available configurations before configuring the sensing nodes 12, without the need to re-certify configuration of the sensing nodes 12 when reconfiguring.

In embodiments, the smart sensor system 10 can include one or more edge sensing nodes 12*e*. The edge sensing nodes 12*e* include the components and functionality described with respect to sensing nodes 12. In addition to, or instead of the integral sensors 22, each edge sensing node 12*e* includes an external interface 40 that can communicate with one or more external sensing elements 42 that are external to the edge sensing node 12e. The external sensing elements 42 can be analog, discrete, or digital sensors. The external sensing element 42 is coupled to the edge sensing node 12e for receiving power, receiving excitation, configuration, or control signals, and/or for transmitting sensing data to the edge sensing node 12e. The term "external" refers to being located outside or not mounted to an enclosure of the edge sensing node 12e. For example, the external sensing element 42 is connected by a wire to the edge sensing node 12e, wherein the wire penetrates the enclosure of the edge sensing node 12e and is terminated on the circuit card assembly. The external sensing element 42 does not have access to communicate with the digital bus 14, the other sensing nodes 12, or the host 16 other than through the edge sensing node 12e to which it is coupled. The external sensing elements 42 can be analog, discrete, or digital sensors that perform continual sensing based on request or configuration. Additionally, the external sensing elements 42 can have the ability to perform some signal conditioning or pre-processing.

The edge sensing node 12e can trigger an event in accordance with the event detection and edge triggering criteria with which it is configured. Regarding event detection, an event can be detected based on sensed data from one or more of the edge sensing node's 12e integral sensing element(s) 22 and/or the external sensing element(s) 42 that are configured to communicate with the edge sensing node 12e in accordance with the event detection criteria with which the edge sensing node 12e is configured. The processing device 20 can process the sensing data output by each of the integral sensing elements 22 and external sensing elements 42 to determine whether an event was detected by the corresponding integral sensing element 22 or external sensing element 42. Determination of event detection can include, for example, comparing a threshold to the sensing data or a rate of change of the sensing data, detecting a particular trend in the sensing data, and/or detecting repeated occurrences of exceeding a threshold.

Regarding event triggering, an event can be triggered based on event detection associated with sensing data output by one or more of the integral sensing elements 22 and external sensing elements 42 in accordance with the edge triggering criteria with which the edge sensing node 12e is configured. The processing device 20 apply configurable logic operations to a determination of event detection associated with the sensing data output by the different integral sensing elements 22 and/or external sensing elements 42. For example, an event can be triggered based on an event being detected by only one of these integral sensing elements 22, a predetermined combination of these integral sensing elements 22, only one of these external sensing elements 42, a predetermined combination of these external sensing elements 42, or a predetermined combination of these integral and external sensing elements 22 and 42.

The processing device 20 can use hardware, firmware, and/or software to detect events and to detect event triggers. For example, the processing device 20 can use analog, digital, or logic circuits to compare sensing data to a threshold. In another example, the processing device 20 can use a programming logic device having a logic circuit or applying software to determine whether an event has been triggered.

The event trigger can cause an action set to be performed. In accordance with one action set, a configurable set of one or more of the internal sensing elements 22 or external sensing elements 42 is caused to change modes from a listening mode in which output sensing data is merely buffered, to an event mode in which the output sensing data is retained for a specified amount of time or recorded for long term storage. When in the listening mode, the sensor node 12 continuously senses and records sensing data. In accordance with another action set, a configurable set of one or more unpowered external sensing elements 42 is caused to be powered on for operating in the listening mode. The external sensing element 42 can be powered on temporarily, such as for a predetermined time interval or acquisition of sensed data samples, after which the external sensing element can return to a state of being unpowered. The power for powering the external sensing element 42 can be provided by the edge sensing node 12e to which the external sensing element 42 is coupled. The action set can be any of the selected actions that can be performed by the sensing nodes 12. The sensing, event detection, event trigger, and performance of the action set is performed autonomously with respect to the host 16.

Figure 2:
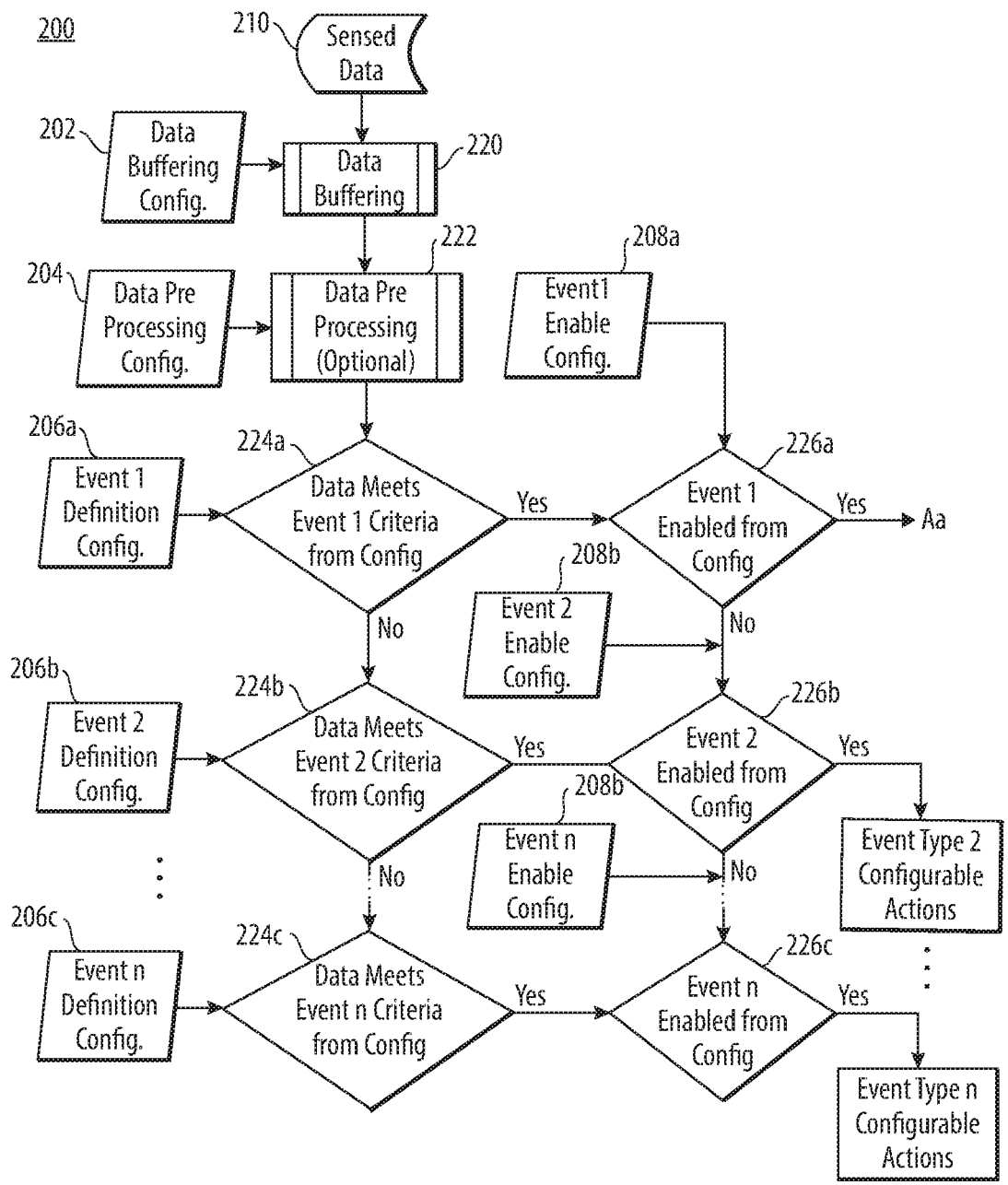
FIG. 2 is a flowchart illustrating an example method of a distributed network of sensing nodes configured to trigger selected actions based on a detected event in accordance with embodiments of the disclosure.
Figure 3A:
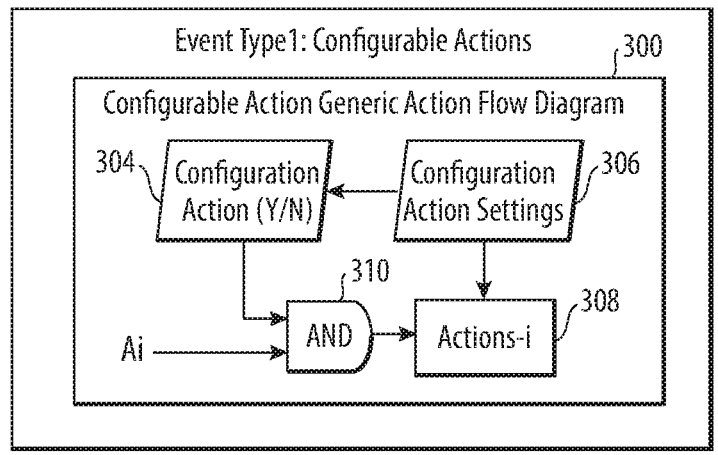
FIG. 3A is a flow diagram illustrating a method of performing the selected actions in accordance with embodiments of the disclosure.
Figure 4:
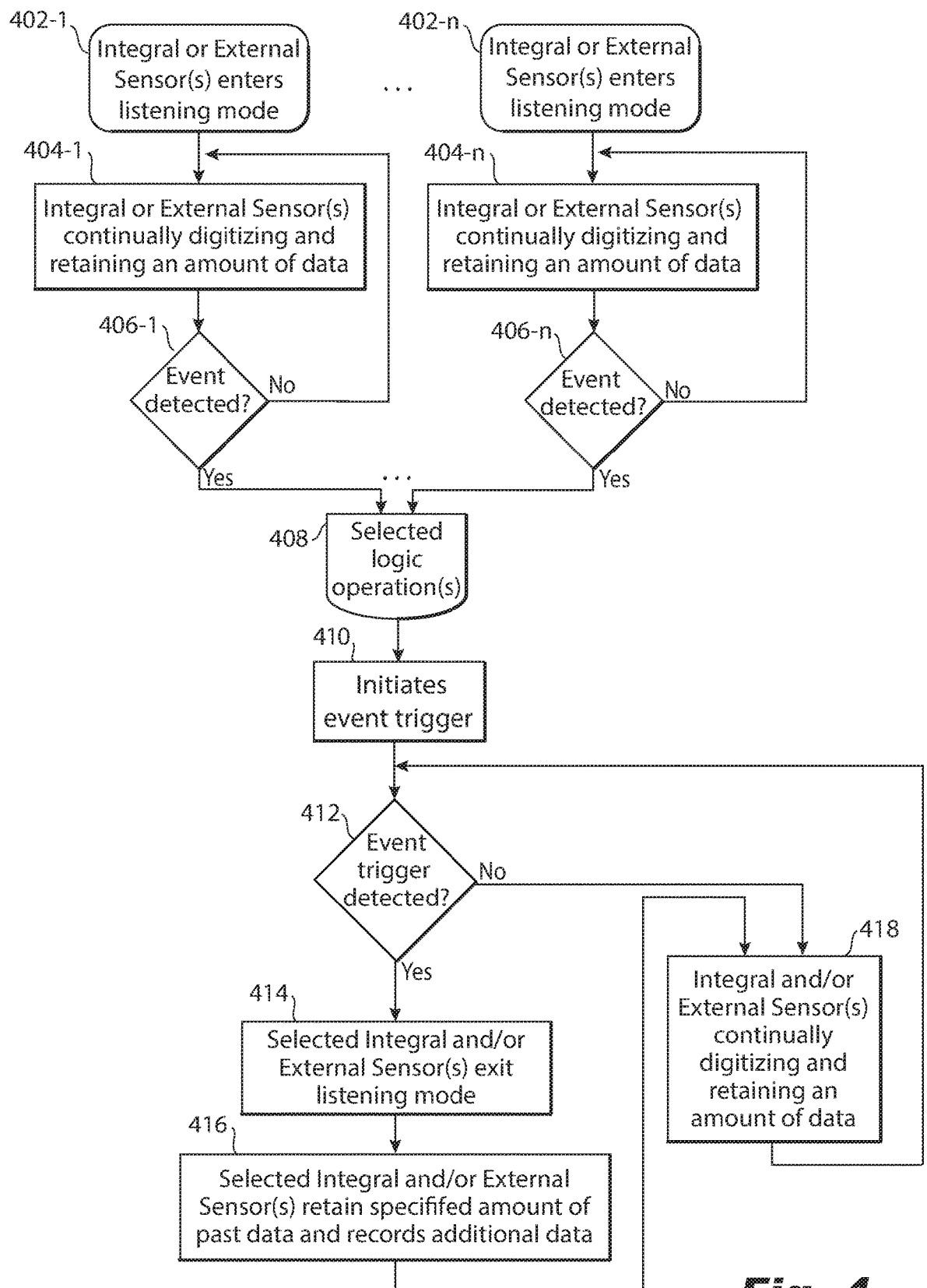
FIG. 4 is a flow diagram illustrating a method performed by an edge sensor node of distributed sensing nodes communication with the host or controller via the bus, in accordance with embodiments of the disclosure.

With reference now to FIGS. 2, 3A, and 4, shown are flowcharts demonstrating implementation of the various exemplary embodiments. It is noted that the order of operations shown in FIGS. 2, 3A, and 4, is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 2 shows a flowchart 200 that illustrates a method performed by a sensing node of a smart sensor system, such as one of sensing nodes 12a-12n of smart sensor system 10 shown in FIG. 1. At input 210 sensed data is received from a sensing node. However, before processing the sensed data received at input 210, the sensing node has been configured by receiving a data buffering configuration at input 202, a data pre-processing configuration at input 204, an event i definition as configured for defining event i at each input 206i, and an event i enable as configured for enabling detection of event i at each input 208i, where i=a-n. Each event i enable is set to LOW to disable event detection or HIGH to enable event detection.

At input 210, sensed data is received from one or more integral sensing elements 22 or external sensing elements 42. At operation 220 the sensed data is temporarily buffered. At operation 222, optional pre-processing of the sensed data can be performed by the integral sensing elements 22, the A/D SC component 28, and/or the processing device 20.

At each operation 224i, a determination is made whether the buffered sensed data, after the pre-processing, if any, satisfies the definition of event i as defined by the event i definition. If the determination for all of the operations 224i is NO, then no actions are taken, and the method continues receiving incoming sensed data at input 210. If the determination at operation 224i is YES, the method continues at operation 226i. If the definition of more than one event i is satisfied, the sensing node can be configured so that one event i would be superseded by another. For instance, if the sensed data is above a first value, an event definition can be satisfied that causes an action that increases the sample rate of the sensing element (22 or 42) to x, whereas if the sensed data is above the first value and a second value that is higher than the first value, an action can be caused to increase the sample rate to y. In embodiments, more than one non-conflicting operation 224i can be performed at the same time, e.g., in parallel, staggered, or sequentially, i.e., in order from 1-n.

At each operation 226i, a determination is made whether the determination output by operation 224i was YES, meaning the definition of event i was satisfied by the sensed data AND detection of event i is enabled by the event i enable signal. If the determination for all of the operations 226i is NO, then no actions are taken, and the method continues receiving incoming sensed data at input 210. If the determination at operation 226i is YES, then an action enable signal Ai for enabling performance of Action set 308-i is changed from a LOW signal to a HIGH signal.

With reference to FIG. 3A, a flow diagram 300 illustrates an example method that continues from the flowchart 200 in FIG. 2, showing the action(s) that can be enabled for and performed by the sensing node. At input 304, a configuration action signal that generically enables or disables performance of an action is received. The term "received" as used can refer to referencing, accessing, reading, accepting a transmission, or otherwise obtained. In the example shown, the configuration action signal is specified in the configuration file and referenced at input 304.

At input 306, configuration settings are received that specify details of the actions in each of the action sets 308-i included in action block 308, which includes action sets 1-n. For example, the configuration action signal can enable a particular action set, such as an action set to notify the host, and the configuration setting can specify on which bus to send the message used to notify the host. In the example shown, the configuration action signal is specified in the configuration file and referenced at input 306.

Figure 3B:
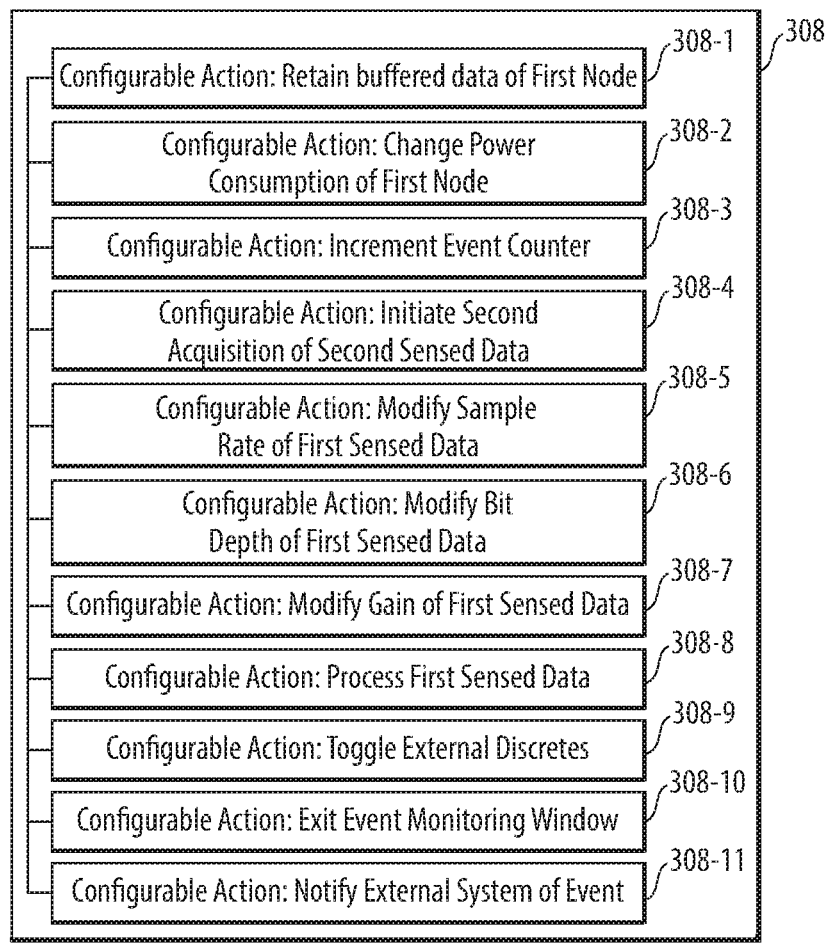
FIG. 3B is a block diagram of action sets that can be enabled in accordance with embodiments of the disclosure.

FIG. 3B is a block diagram showing action block 308 with n different example action sets 308-i. A logic AND operation is performed at operation 310 that applies the logic AND operation to the configuration action signal received at input 304 and the action enable signal Ai output from operations 226i of flowchart 200 in FIG. 2. The output of the logic AND operation performed at operation 310 enables only the action set 308-i (or non-conflicting action sets 308-i) for which the enable signal Ai was HIGH. Once an action set 308-i is enabled to be performed, the action enable signal Ai can remain high so long as the event is occurring, after which the action enable signal Ai can be reset to LOW.

In the example shown, the action sets 308-i include: 308-1, retain a certain time duration of data; 308-2, adjust power consumption of the sensing node 12; 308-3, increment an event counter of the sensing node 12; 308-4, Initiate a second acquisition of different sensed data by a second sensing node 12; 308-5, modify a sampling rate of the sensed data; 308-6, modify a bit depth of the sensed data; 308-7, modify gain of the sensed data; 308-8, process the sensed data; 308-9, toggle a channel and/or external component; 308-10, terminate monitoring for an event by the sensing node; and 308-11, send a notification to an external system of the detected event.

Regarding action set 308-1, configuration settings are received that define: a number of samples to retain from buffered pre-event data, meaning sensing data buffered before the event 308-1 was detected; and a number of samples to retain from buffered post-event, meaning sensed data buffered after the event enable signal A1 was detected; and a specification of whether to retain the retained data in volatile memory (VM) or non-volatile memory (NVM). When action set 308-1 is performed, the data is retained as specified by the configuration settings.

Regarding action set 308-2, configuration settings are received that specify a power consumption mode to use. When action set 308-2 is performed, power consumption is transitioned to the specified power mode.

Regarding action set 308-3, configuration settings are received that specify an integer increment step and a maximum counter value. When action set 308-3 is performed, the current event counter value is incremented, provided it does not exceed the maximum counter value, if specified.

Regarding action set 308-4, configuration settings are received that specify configuration settings for the second sensor node 12. When action set 308-4 is performed, acquisition of second sensing data by the second sensor node 12 is initiated using the configuration settings specified, and the second sensing data is output.

Regarding action set 308-5, configuration settings are received that specify a modified sample rate. When action set 308-5 is performed, the sensed data is acquired at the modified sample rate and output as the sensed data.

Regarding action set 308-6, configuration settings are received that specify a modified bit depth. When action set 308-6 is performed, the sensed data is acquired at the modified bit depth and output as the sensed data.

Regarding action set 308-7, configuration settings are received that specify a modified gain. When action set 308-7 is performed, the sensed data is acquired at the modified gain and output as the sensed data.

Regarding action set 308-8, configuration settings are received that specify processes to perform for processing the sensed data. When action set 308-8 is performed, the process is performed on the sensed data and a result of the processing is output.

Regarding action set 308-9, configuration settings are received that specify settings to toggle a state of one or more external components or channels associated with the respective external components. For example, the configuration settings can specify a type for each channel or component, for example a type ground/open (e.g., which can be used for an output line external component that is grounded when toggled HIGH, and opened when toggled LOW) or voltage/open (e.g., which can be used for an output line external component to which a configurable voltage is applied (e.g., 5V, 28V, etc.) when toggled HIGH, and is opened when toggled low LOW) for a configurable duration of time. When action set 308-9 is enabled, each channel and/or external component controlled by action set 308-9 can be toggled.

Regarding action 308-10, configuration settings are received that specify a counter exit setting for an event counter that counts a number of occurrences of detection of event 10 (that is enabled by event enable signal A10), at which to exit monitoring, wherein the exit setting is the value at which to exit monitoring for event 10. When action set 308-10 is performed, the event counter's current value is compared to the exit setting. If it is determined that the current event counter value exceeds the exit setting, then the event monitoring of event 10 is exited.

Regarding action set 308-11, configuration settings are received that specify an address for an external destination and a channel to use for sending notifications to the external destination. When action set 308-11 is performed, a notification is sent to the address specified using the channel specified.

FIG. 4 shows a flowchart 400 that illustrates an example method performed by a sensing node of a smart sensor system, such as one of sensing nodes 12a-12n of smart sensor system 10 shown in FIG. 1. In embodiments, the method is performed by an edge sensing node of a smart sensor system, such a sensing node 12e of smart sensor system 10 shown in FIG. 1. Operations 402-1-n, 404-1-n, and 406-1-n, are performed for n sensing elements or n combination of sensing elements of the edge sensing node. The n sensing elements can be any of integral sensing elements or external sensing elements, such as integral sensing elements 22 and external sensing elements 42 shown in FIG. 1.

At operation 402-j, where j is a value between 1-n, one or more sensing elements, which can be one or more integral or one or more external sensing elements, enters a listening mode. At operation 404-j, the one or more sensing elements continually digitize and retain an amount of data, e.g., in a buffer. At operation 406-j, a determination is made whether an event is detected. If the determination at operation 406-j is that NO an event is not detected, then the method continues at operation 404-j for continued digitization and retention of sensing data as it is sensed and a positive input is not applied to logic operation 408 (meaning a negative input (e.g., logic LOW) is applied). If the determination at operation 406-j is that YES an event is detected, a positive input (e.g., logic HIGH) is applied to logic operation 408.

Operations 402-1-n, 404-1-n, and 406-1-n can be performed using any selected combination of one or more integral and/or external sensing elements. Each set of operations 402-j, 404-j, and 406-j can be performed on one sensing element or multiple sensing elements of the same type of integral or external sensing elements.

The logic operation 408 can include a selected logic operation (e.g., AND, OR, NOR, NAND) or a combination of selected operations. In the example shown, a logical AND operation is shown, without limiting the disclosure to a particular logic operation. The logic operation 408 processes the inputs that are applied and outputs a logic LOW or HIGH signal, based on a determination of logic processing performed by the logic operation 408.

In embodiments, only one set of operations 402-j, 404-j, and 406-j is provided and its output applied to logic operation 408. In these embodiments, logic operation is configured to recognize when an event is detected at operation 406-j.

Operation receives the output of logic operation 408 and initiates an event trigger only when a particular logic value, e.g., logic HIGH, is received; otherwise an event is not triggered. At operation 412, a determination is made whether an event is triggered. If the determination at operation 412 is that NO an event is not triggered, then at operation 418, the sensing elements performing at operations 404-1-n continue to perform in the same way, by continuing to digitize and retain an amount of data.

If the determination oat operation 412 is that YES an event is triggered, then at operation 414 a selected action is performed, based on the particular event that was triggered. In the example shown, the selected action is performed at operations 414 and 416. At operation 414, an action is performed in which one or more selected integral and/or external sensing elements exit the listening mode. At operation 416, an action is performed in which the selected sensing element (s) retain specified amount of past data and record additional data. The method continues at operation 418.

It is to be appreciated the embodiments of the disclosure include software algorithms, programs, or code that can reside on a computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware, or as a software computer product available on a disc, a memory storage device, or for download from a remote machine. The embodiments described herein include such hardware, firmware, and/or software to implement the logic, equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

A potential advantage of the various embodiments of the smart sensing system disclosed is the ability to configure sensing nodes of a distributed system with pre-certified configuration settings. The sensing nodes can detect events and perform actions based on the configuration settings autonomous of a host or controller. Sensing nodes and capabilities per sensing node can be added and removed without the need to recertify. Reconfiguration can be performed any time during the lifetime of the sensing node. Such reconfiguration can be performed during a sensing session of the smart sensing system, such as by the controller. Interaction and/or coupling with the host or controller can be limited to configuration before or during a sensing session and/or downloading data for analysis. The distributed nature of the smart sensing system reduces weight of components and cabling.

While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A sensor node of a plurality of sensor nodes of a sensing network having a controller and/or a host the sensing network being configured for monitoring a system, the sensor node comprising:
one or more of at least one integral sensing elements and an interface for communicating with at least one external sensing element, wherein each of the integral sensors is internal to the sensor node and is configured to sense a physical characteristic of the system and output associated first sensing data, and wherein each of the at least one external sensing element is external to the sensor node and is configured to sense a physical characteristic of the system and output associated second sensing data;
a processing device configured to:
be configured with a configuration file selected from a plurality of configuration files, the configuration file defining a plurality of action sets to perform in association with detection of respective first and second events;
acquire at least one of the first and second sensing data from a respective at least one of the integral sensing element and the at least one external sensing element;
detect the first and second events as a function of at least one of the first and second sensing data based on the configuration file;
initiate an event trigger; and
perform a first action set of the plurality of action sets as a function of detecting the first event and perform a second action set of the plurality of action sets as a function of detecting the second event, wherein the first and second action sets are defined by the configuration file, the first action set is only performed upon initiation of the event trigger, and detection of the event trigger is a function of at least one logic operation applied to output of detection of the first and second events as a function of sensing data output by at least two sensing elements of the at least one integral sensing elements and the at least one external sensing elements, and once the processing device is configured with the configuration file, detection of the first and second events and performance of any of the first and second action sets is performed autonomously of the controller and the host of the sensing network.

2. The sensor node of claim 1, wherein,
the processing device is further configured to initiate an event trigger,
the first action set is only performed upon initiation of the event trigger, and
the event trigger is initiated whenever the first event is detected.

3. The sensor node of claim 1, wherein the sensing data output by the at least two-sensing elements includes the first sensing data as output by first and second integral sensing elements of the at least one integral sensing element.

4. The sensor of claim 1, wherein the sensing data output by the at least two sensing elements includes the first sensing data as output by a first integral sensing elements of the at least one integral sensing element and a first external sensing element of the at least one external sensing element.

5. The sensor of claim 1, wherein,
the processing device is further configured to initiate at least one event trigger,
the first and second action sets are only performed in response to initiation of one of the at least one event trigger, and
before the at least one event trigger is detected, the at least one integral sensing element and the at least one external sensing element operate in a listening mode to continually retain a limited amount of the respective first and second sensing data.

6. The sensor of claim 5, wherein operating in the listening mode by the at least one integral sensing element and the at least one external sensing element further includes continually digitizing prior to the retaining the limited amount of the respective first and second sensing data.

7. The sensor of claim 5, wherein,
the first action set includes at least one sensing element of the at least one integral sensing element and the at least one external sensing element exiting the listening mode, and
exiting the listening mode includes retaining at least a predetermined portion of the first and/or second sensing data sensed by the at least one sensing element of the at least one integral sensing element and the at least one external sensing element that exited listening mode before exiting the listening mode.

8. The sensor of claim 7, wherein,
the at least one sensing element exiting the listening mode further includes submitting a second specified amount of the first or second sensing data for recordation by an external recording device, and
the second specified amount including at least one of a third specified amount of previously retained first or second sensing data and a fourth specified amount of not yet output first or second sensing data.

9. The sensor of claim 5, wherein the at least one sensing element operating in the listening mode includes continually monitoring whether the at least one event trigger was initiated.

10. The sensor of claim 1, wherein the processing device is re-configurable for being configured with a second configuration file different than the first configuration file at any time during a lifetime of the sensor node.

11. The sensor of claim 1, wherein,
prior to detection of the first and second events, the at least one external sensor is unpowered, and
the first action set includes controlling provision of power to the at least one external sensor for providing power to the at least one external sensor.

12. The sensor of claim 11, wherein controlling provision of the power to the at least one external sensor includes controlling the provision of the power to be temporary.

13. A method performed by a sensor node of a plurality of sensor nodes of a sensing network having a controller and/or a host, the sensing network being configured for monitoring a system, the method comprising:
being configured with a configuration file selected from a plurality of configuration files, the configuration file defining a plurality of action sets to perform in association with detection of respective first and second events;
acquiring at least one of first and second sensing data associated with sensing a physical characteristic of the system, the first sensing data being acquired internal to the sensor node, and the second sensing data being acquired external to the sensor node via an interface;
detecting the first and second events as a function of at least one of the first and second sensing data based on the configuration file;
initiating an event trigger;
performing a first action set of the plurality of action sets as a function of detecting the first event, wherein the first action set is only performed upon initiation of the event trigger; and
performing a second action set of the plurality of action sets as a function of detecting the second event, wherein the first and second action sets are defined by the configuration file, the first action set is only performed upon initiation of the event trigger, and detection of the event trigger is a function of at least one logic operation applied to output of detection of the first and second events as a function of sensing data output by at least two sensing elements of the at least one integral sensing elements and the at least one external sensing elements, and after being configured with the configuration file, detection of the first and second events and performance of any of the first and second action sets is performed autonomously of the controller or the host of the system.

14. The method of claim 13, the method further comprises initiating at least one event trigger, wherein,
the first and second action sets are only performed in response to initiation of one of the at least one event triggers, and
before the at least one event trigger is detected, the at least one integral sensing element and the at least one external sensing element operate in a listening mode to continually retain a limited amount of the respective first and second sensing data.

15. The method of claim 13, wherein
the first action set includes at least one sensing element of the at least one integral sensing element and the at least one external sensing element exiting the listening mode, and
exiting the listening mode includes retaining at least a predetermined portion of the first and/or second sensing data sensed by the at least one sensing element of the at least one integral sensing element and the at least one external sensing element that exited listening mode before exiting the listening mode.

16. The method of claim 13, wherein,
prior to detection of the first and second events, the at least one external sensor is unpowered, and
the first action set includes controlling provision of power to the at least one external sensor for providing power to the at least one external sensor.

17. A controller or host of a sensing network, the sensing network having a plurality of sensor nodes for monitoring a system, each of the sensor nodes associated with a sensor element configured to sense a physical characteristic of the system and output associated second sensing data, the controller or host comprising:
a memory configured to store instructions;
a processor disposed in communication with the memory, wherein the processor, upon execution of the instructions is configured to:
configure each of the plurality of sensor nodes to:
detect first and second events as a function of the sensing data based on the individual sensor's configuration and to initiate an event trigger;
perform based on the individual sensor's configuration a first action set of a plurality of action sets as a function of detecting the first event and perform a second action set of the plurality of action sets as a function of detecting the second event, wherein the first action set is only performed upon initiation of the event trigger, and detection of the event trigger is a function of at least one logic operation applied to output of detection of the first and second events as a function of sensing data output by at least two sensing elements of the at least one integral sensing elements and the at least one external sensing elements,
wherein, once a sensor node of the plurality of sensor nodes is configured, the controller and the host is not involved in the sensor node detecting the first or second events or performing the first or second action sets.

18. The controller or host of claim 17, wherein the processor, upon execution of the instructions, is further configured to receive data from the sensor node as a result of the sensor node performing one or more of the first action set and the second action set, regardless of whether the controller or host was coupled to the sensor node when the sensor node detected one or more of the first and second events.

* * * * *